_United States Patent Office_

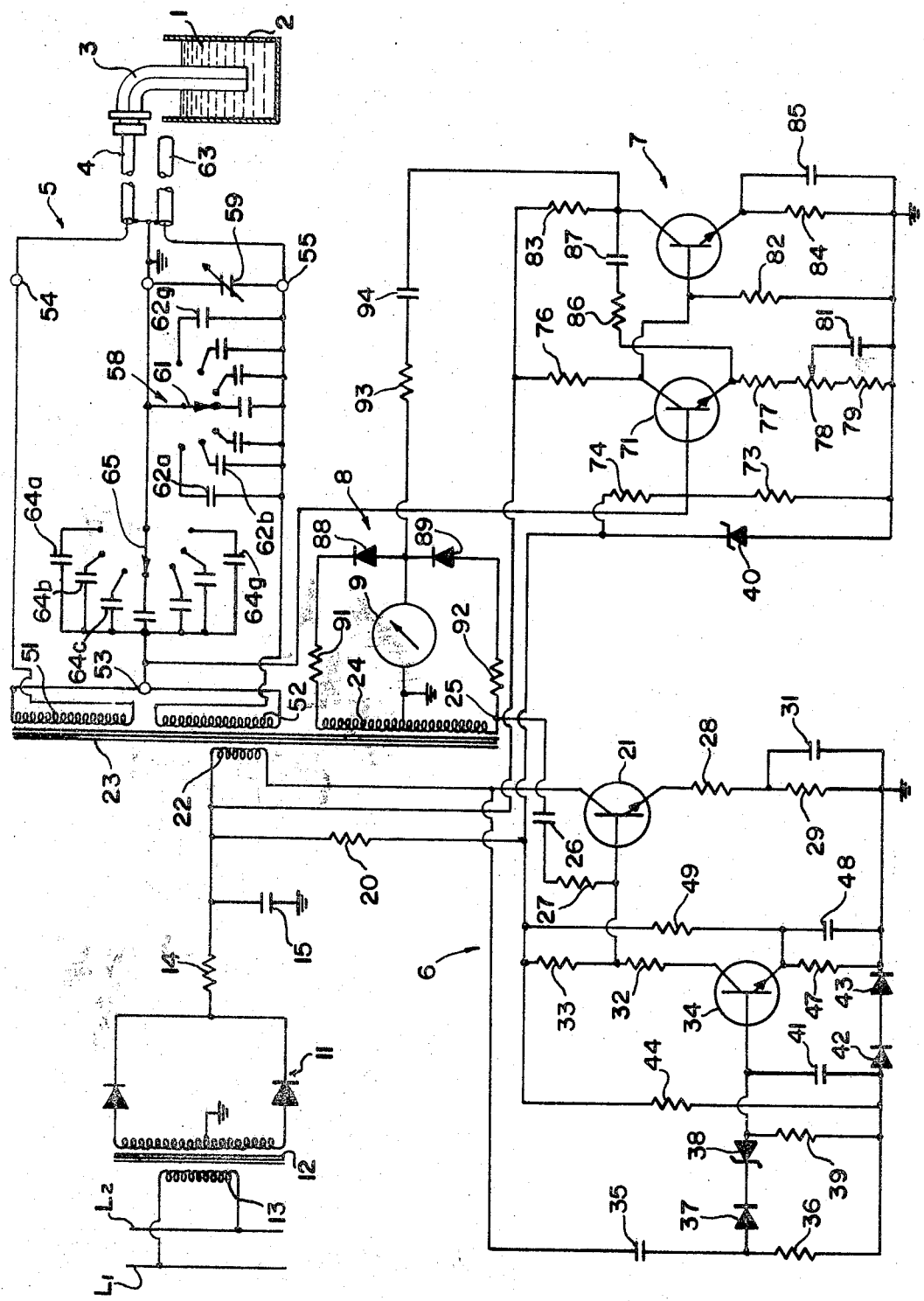

3,339,412
Patented Sept. 5, 1967

3,339,412
CAPACITANCE MEASURING APPARATUS
Frederick L. Maltby, 1417 Edge Hill Road,
Abington, Pa. 19001
Filed Oct. 18, 1965, Ser. No. 497,340
12 Claims. (Cl. 73—304)

The general object of the present invention is to provide a new and improved electrical measuring apparatus. More specifically, the present invention is concerned with a capacitance-type measuring apparatus in which a capacitor responsive to the condition being measured is employed to produce a direct current output proportional to the condition being measured.

Prior art capacitance-type measuring apparatus have not found widespread acceptance in industry as means for monitoring and measuring process conditions. Generally, these prior art devices have been unstable, difficult to calibrate, and limited in application. One particular shortcoming of these prior art devices is that they generally are not adapted for remote indication because of the stray capacity introduced into the measuring circuit by the electrical connections between the measuring apparatus and the remote condition-sensitive element. The inability to compensate for stray capacity has either limited the use of such apparatus to local applications, or necessitated the location of the measuring apparatus adjacent to the condition being measured. Another specific failing of prior art capacity-type measuring apparatus is the lack of independent span and zero adjustments.

It is an object of the present invention to provide an inexpensive and reliable capacity-type measuring apparatus characterized by stability, accuracy and adaptability.

It is another object of the present invention to provide a measuring apparatus of the type described having means for compensating for the capacity introduced into the measuring circuit by the connection between the apparatus and the condition-sensing element thereby adapting it for remote indication and calibration.

Still another object of the present invention is to provide new and improved capacity-type measuring apparatus with independent span and zero adjustments.

A further object of the present invention is to provide a measuring apparatus of the type described characterized by ease and stability of the calibration.

The foregoing objects of the present invention are accomplished in measuring apparatus in which a capacitance bridge is energized by the amplitude stabilized output of an oscillator. The capacity bridge has for two of its adjacent arms a pair of equal windings energized by the oscillator, and as the opposite adjacent arms, a capacitor responsive to the condition being measured and capacitance zero adjustment means. Phase responsive means energized by the output of the oscillator is utilized to produce a direct current signal proportional in magnitude to the magnitude of the bridge output and dependent in phase on the phase of the bridge output. The phase responsive means comprises a feedback stabilized amplifier and a phase-sensitive rectifier. Span adjustment which is independent of the zero output point of bridge is provided by variable capacitor means connected in shunt across the output of the bridge circuit and by the adjustment of the gain of the amplifier in the output of the apparatus.

A better understanding of the present invention may be had from the following description when read with reference to the accompanying drawing which is a circuit diagram of a preferred embodiment of the present invention.

Referring now to the drawing, there is shown an embodiment of the present invention adapted to indicate the level of the material 1 in the tank 2. The level of the material 1 is sensed by means of a condition-sensitive capacitor 3 in the form of a probe which is connected by means of a cable 4 as an arm of a capacitance bridge generally designated by the numeral 5. Generally, the indicating apparatus of the present invention comprises the capacity bridge 5 which is energized by the output of an amplitude stabilized oscillator generally designated by the numeral 6. The output of the bridge circuit is converted into a direct current by suitable phase responsive means. In this embodiment of the present invention, the output of the capacitance bridge 5 is first amplified by an amplifier 7, the output of which is applied to a phase-sensitive rectifier 8 which is also energized from the output of the oscillator 6. A milliameter 9 connected across the output of the phase-sensitive rectifier 8 provides an indication of the level of the material 1 in the tank 2. As will be explained in more detail hereinafter, where desirable the output of the bridge circuit 5 can be rectified prior to amplification.

The power of supply for the indicating apparatus of the present invention comprising a full wave rectifier 11 energized from the transformer 12 having a primary winding 13 connected across suitable source of alternate current shown here as conductors $L_1$ and $L_2$. The output of the power supply is across a filter capacitor 15 which is connected to the output of the rectifier circuit 11 by means of a resistor 14.

The oscillator 6 is a class C oscillator, the amplitude of which is stabilized by a DC feedback circuit. The oscillator 6 employs a transistor 21 having the usual emitter, collector and base. The collector of the transistor 21 is connected through the primary winding 22 of the transformer 23 to the output of the power supply. The transformer 23 has three secondary windings including the centered taped winding 24 which energizes the phase-sensitive rectifier 8. The regenerative feedback coupling between the input and the output of the transistor 21 is provided by a capacitor 26 and a resistor 27 connected in series between one end 25 of the winding 24 and the base of the transistor 21. The emitter of the transistor 21 is connected to ground through a conventional biasing circuit comprising a resistor 28 and a resistor 29 which is by-passed by a capacitor 31. The base of the transistor 21 is connected to the junction of a pair of resistors 32 and 33 in the collector circuit of a transistor 34. The resistors 32 and 33 are connected to the power supply through a resistor 20. The voltage across these resistors is regulated by a Zener diode 40 in the input circuit of the amplifier 7.

The transistor 34 controls the bias on the input of the transistor 21 to stabilize the amplitude of the oscillator output. For this purpose, a portion of the output of oscillator 6 is fed back through a capacitor 35 connected between the collector of the transistor 21 and the base circuit of the transistor 34. This feedback circuit also includes a resistor 36, a diode 37 and a Zener diode 38. The diodes 37 and 38 are connected in series between the junction of the capacitor 35 and the resistor 36 and the base of the transistor 34. Bias for the base of the transistor 34 is provided by a network comprising a resistor 39, a capacitor 41 and the forward voltage drop of a pair of diodes 42 and 43 which are connected between ground and the resistor 39 and the capacitor 41. A resistor 44 connected between the diode 42 and the power supply through the resistor 20 provides the current for the diodes 42 and 43. As will be explained in more detail hereinafter, the diodes 42 and 43 provide temperature compensation for the oscillator 6. The emitter of the transistor 34 is connected to ground through a resistor 47 which is by-passed by a capacitor 48 in the conventional manner. The capacitor 48 is also conected to the resistor 20 by a resistor 49.

The output of the oscillator 6 energizes the capacitance bridge 5 through the transformer 23. The transformer 23 has a pair of equal secondary windings 51 and 52 which are connected as adjacent arms of the bridge 5. As shown, the secondary winding 51 is connected between the bridge terminals 53 and 54, similarly, the secondary winding 52 is connected to bridge terminals 53 and 55. The opposite adjacent arms of the bridge 5 are the capacity probe 3 which is connected between bridge terminals 54 and 56 by means of the cable 4 and the bridge zero adjusting means connected between bridge terminals 55 and 56. The zero adjusting means includes incrementally adjustable capacity means 58 for providing a coarse adjustment of the zero output of the bridge and the continuous variable capacitor 59 for providing a fine adjustment of the zero output of the bridge. The coarse adjusting means 58 comprises a manually adjustable stepping switch 61 having a movable contact connected to the bridge terminal 56 and a plurality of stationary contacts each connected to the bridge terminal 55 by means of a different capacitor. The capacitors connected between the terminal 55 and the stationary contacts of the switch 61 are generally designated 62a through 62g and have increasing values so that, as the movable contact of the switch 61 engages each successive stationary contact moving in the counterclockwise direction, an increasingly larger capacity is connected between the bridge terminals 55 and 56. As stated before, the fine adjustment of the zero output of the bridge 5 is provided by the continuously variable capacitor 59 which is also connected between the bridge terminal 55 and 56, and hence, in parallel wih the coarse zero adjustment means 58. The magnitude of the capacitor 59 is such that it spans the difference between the capacity of the capacitors 62a through 62g.

As noted above, the capacity probe 3 is connected as an arm of the bridge 5 by means of the cable 4. Unless compensation is provided for the capacity introduced into the circuit by the cable 4, this capacity will be reflected in the bridge output. In the measuring apparatus of the present invention, this compensation can be provided by connecting across the terminals 55 and 56, a "dummy" cable 63 of a length equal to the length of the cable 4. This practical means of compensating for effect of the cable 4 is made possible because of the utilization of equal windings 51 and 52 as the bridge arms opposite to the arms to which the cables 4 and 63 are connected.

The output terminals of the bridge 5 are the terminals 53 and 56, the latter of which is adapted to be connected to ground. The measuring apparatus of the present invention is provided with both coarse and fine span adjustments. The coarse span adjustment is provided by capacitors 64a through 64g which are adapted to be sequentially connected across the output terminals 53 and 56 of the bridge by means of the manually adjustable stepping switch 65. The stepping switch 65 has a movable contact and a plurality of stationary contacts each associated with one of the capacitors 64a through 64g. The capacitors 64a through 64g have increasing values so that as the movable contact of the switch 64 is moved in a counterclockwise direction and engages successive stationary contacts, an increasingly larger capacity is connected between the bridge terminals 53 and 56.

Fine span adjustment is provided by varying the gain of the amplifier 7 which is also connected across the output terminals of the bridge 5. The amplifier 7 is a two-stage direct coupled amplifier employing transistors 71 and 72 as its amplifying elements. The transistors 71 and 72 are npn junction-type transistors having the usual collector, emitter and base. The base of the transistor 71 is connected to the junction of the resistors 73 and 74 which form a voltage divider between ground and the resistor 20 which is connected to the output of the power supply. The voltage across the resistors 73 and 74 is regulated by the Zener diode 40. The collector of the transistor 71 is connected through the resistor 76 to the resistor 20. The emitter of the transistor 71 is connected to ground through resistors 77, 78 and 79. The resistor 78 is a variable resistor having a manually adjustable tap 80 which is connected to ground by a by-pass capacitor 81. The gain of the amplifier 7 and a fine adjustment of the span of the apparatus may be made by manually positioning the tap 80 on the resistor 78. The base of the transistor 72 is directly coupled to the collector of the transistor 71 and is also connected to ground through the resistor 82. The collector of the transistor 72 is connected to the conductor 76 and, hence, the power supply by means of the resistor 83. The emitter of the transistor 72 is connected to ground by a resistor 84 which is by-passed by means of a capacitor 85. Feedback for the stabilization for the amplifier 7 is provided by a connection including a resistor 86 and the capacitor 87 connected in series between the collector of the transistor 72 and the emiter of the transistor 71.

The output of the amplifier 7 is connected to the input of the phase-sensitive rectifier 8 by means of a connection including a series connected resistor 93 and a capacitor 94. The phase-sensitive rectifier 8 is energized by the center tapped winding 24 of the transformer 23. The phase-sensitive rectifier 8 includes the conventional diodes 88 and 89 connected to the respective ends of the winding 24 by means of the current limiting resistors 91 and 92. The output of the phase-sensitive rectifier 8 is between the center tap of the winding 24 and the junction of the diodes 88 and 89. As shown, a meter 9 is connected across the output of the phase-sensitive rectifier 8 to provide an indication of the current produced across the output of the phase-sensitive rectifier 8 which is proportional to the output of the capacitance bridge 5.

In considering the operation of the indicating apparatus of the present invention, it should be noticed that it is not a closed loop system. Accordingly, it is necessary that the output of the oscillator 6 be precisely stabilized. In accordance with the present invention, a portion of the oscillator output is fed back and rectified to control the bias on the oscillator and hence its gain. To make this control more effective, the class C mode of oscillation is utilized. Feedback for the stabilization of the oscillation is provided by means of the capacitor 35. The positive peak of this feedback which is an excess of the Zener voltage of the diode 38 is rectified by the Zener diode 38. The diode 37 prevents the conduction of the Zener diode 38 on the negative peak. If the amplitude of the oscillator output increases above the Zener voltage, the signal on the base of the transistor 34 gets more positive causing the collector to become more negative. This reduces the bias on the transistor 21, the base of which is connected in the collector circuit of the transistor 34. The reduction of the bias on the transistor 21 reduces its gain, and hence, the amplitude of the oscillator output thereby establishing regulation.

As noted hereinbefore, the diodes 42 and 43 provide temperature compensation for the oscillator. There are two temperature effects for which compensation must be provided. If the temperature of the diode 37 increases, the current output of the transistor 34 tends to increase. Increases in temperature will also cause the base to emitter voltage of the transistor 34 required for a given collector current to decrease. Together these effects will tend to reduce the amplitude of the oscillator output. The temperature coefficients of the diodes 43 and 42 are such that, as their temperatures increase, the positive bias on the base of the transistor 34 is reduced thereby providing compensation for the temperature effects described.

Several features of the bridge circuit 5 are important in considering the operation of the present invention. For example, the utilization of the equal windings 51 and 52 for the energization of the bridge makes it possible to neutralize by practical means any stray capacities introduced into the measuring arm of the bridge circuit. Since, the measuring arm and the zero adjusting arm of the bridge are equally energized, compensation can be achieved by adding an impedance to the zero adjusting branch which is identical to any stray impedance introduced into the measuring branch. For example, compensation for the measuring capacitor cable length and cable temperature coefficient can be provided by connecting across the zero adjusting arm of the bridge a similar cable of equal length as that utilized to connect the measuring capacitor to the bridge circuit. It should be noted as a practical matter that compensation for the distributed capacity of such a cable can be provided with ease only by means of a matching cable of identical length.

Any stray of fixed capacities associated with the windings 51 and 52 relative to the primary winding 22 and relative to ground would ordinarily be introduced into the measuring circuit. In the circuit of the present invention, however, capacities relative to the primary winding 22 are eliminated by conventional electrostatic shielding. Capacity between the windings 51 and 52 and ground are prevented by shields connected to the center tap of the winding. Capacity from the center tap to ground affect only the span which, because of the magnitude of the span adjustment capacitors, has a negligible effect. In this manner, the effects of internal capacities associated with the transformer 23 are minimized.

The utilization of capacitor means connected across the output of the bridge circuit to provide a span adjustment which is independent of the bridge zero adjustment is of particular importance. The output of the capacitance bridge circuit is inherently non-linear for linear changes in capacity. As in most systems, if the fractional change in the capacity being measured is small, linearity can be maintained and the circuit output can be made as linear as desired by making the fractional change as small as required. It is desirable, however, to measure large changes in capacity; for example, changes in capacity up to ten times the initial capacity and maintain linearity. Changes of this magnitude, however, would produce non-linearities on the order of 30%. In the circuit of the present invention, the span adjustment capacity acts as a load on the bridge which reduces the output voltage for a given change in capacity. If the loading of the bridge circuit by this capacity was the same at all values of capacity, there would be no improvement in the linearity. However, as the capacity increases, the bridge impedance is reduced and the loading effect of the span adjusting capacitor is decreased. Surprisingly enough, this reduction in loading is precisely enough to produce a linear output. This is not only true at the extremes of bridge loading but at any degree of loading in between. To handle large changes in capacity, the span adjustment capacity must be very large compared to the bridge capacity or the change capacity required.

Since calibration may be required under circumstances where the anticipated change in capacity is not known, it is necessary to be able to change the span over wide ranges without disturbing the zero capacity. This is accomplished by the coarse and fine adjustment controls described. For example, it has been demonstrated that the changes in capacity can be less than 2 pfds. full scale to more than 1,000 pfds. full scale without disturbing the zero capacity. Furthermore, all ranges in between are linear with 0.3%.

The amplifier 7 employs feedback to stabilize both the gain and the phase of the output. This feedback is adjustable to provide a fine adjustment of the span of the apparatus. In order to provide stable calibration independent of temperature, transistor aging and the like, it is essential that the amplifier have an input impedance sufficiently high that variations in it do not produce variations in the bridge output voltage. In addition, the amplifier must have a relatively low output impedance, extremely stable voltage gain and the relative phase of the amplifier input and output must be stable. All of these conditions are met by the circuit of FIG. 7. The feedback produced between the output voltage tends to stabilize the gain and phase between the amplifier input and output voltages and also tend to raise the input impedance and to lower the output impedance. Stability of recalibration requires using stable components for resistors 77, 78 and 86 and that the capacity of capacitor 87 be large enough that its series impedance does not affect the circuit. Without feedback the gain of the amplifier 7 can be greater than 10,000 but when reduced by the feedback, it is between five and thirty depending upon the setting of the adjustable tap on the resistor 78.

As noted hereinbefore, where desired, the output of the bridge circuit 5 may be rectified and phase demodulated prior to amplification. Such an arrangement is desirable when the power level of the bridge output is high, however, a stabilized direct current amplifier must be employed to amplify the output of the phase-sensitive rectifier.

From the foregoing, it can be seen that there has been described a capacitance type measuring apparatus which is characterized by stability and accuracy. The novel means employed to provide independent span and zero adjustments as well as ease of calibration make the circuit of the present invention highly adaptable to many measuring applications. Means have also been provided for compensating any capacity introduced into the measuring circuit by the connection between the measuring circuit and the condition sensing capacitor.

Having described this invention that which is claimed as new is:

1. A condition measuring apparatus having independent span and zero adjustments comprising, in combination, an amplitude stabilized oscillator, a capacitance bridge having as two of the adjacent arms a pair of windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, a second manually adjustable capacitor connected across the output of said bridge for providing an adjustment of the span of said apparatus, a stabilized amplifier having an input and an output, the input of said amplifier being connected across said second manually adjustable capacitor and a phase-sensitive rectifier energized by the output of said oscillator having an input connected to the output of said amplifier and for producing a direct current output proportional to the condition being measured.

2. A condition measuring apparatus having independent span and zero adjustments comprising, in combination, an amplitude stabilized oscillator, a capacitance bridge having as two of the adjacent arms a pair of windings energized by said oscillator and as the opposite adjacent arms a capacitor responsive to the condition being measured and a first adjustable capacitor for varying the zero output point of said apparatus, the output of said bridge being between the junction of said windings and the junction of said condition sensitive capacitor and said first manually adjustable capacitor, a second adjustable capacitor connected across the output of said bridge for providing an adjustment of the span of said apparatus and phase responsive means connected across the output of said bridge for producing a direct current proportional to the output of said capacitance bridge.

3. A condition measuring apparatus having independent span and zero adjustments comprising, in combination, an amplitude stabilized oscillator, a capacitance bridge having as two of the adjacent arms a pair of equal windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, a second manually adjustable capacitor connected across the output of said bridge, said second manually adjustable capacitor providing an adjustment of the span of said apparatus, a feedback stabilized amplifier having an input, the input of said amplifier being connected across the output of said capacitance bridge, and a phase sensitive rectifier circuit having an input and an output and energized by the output of said oscillator, the input of said rectifier circuit being connected across the output of said amplifier to produce across the output of said rectifier circuit a direct current proportional to the capacity of said condition sensitive capacitor.

4. A condition measuring apparatus having independent span and zero adjustments comprising, in combination, an amplitude stabilized oscillator, a capacitance bridge having as two of the adjacent arms a pair of equal windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, a second manually adjustable capacitor connected across the output of said bridge, said second manually adjustable capacitor providing an adjustment of the span of said apparatus, and phase responsive means connected across the output of said bridge for producing a direct current proportional to the output of said capacitance bridge.

5. A condition measuring apparatus having independent span and zero adjustments comprising, in combination, an amplitude stabilized oscillator, a capacitance bridge having as two of the adjacent arms a pair of windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, span adjustment means connected across the output of said bridge and comprising a second manually adjustable capacitor for providing a coarse adjustment of the span of said apparatus and an amplifier, the gain of which is adjustable to vary the output thereof to provide a fine adjustment of the span of said apparatus, and a phase-sensitive rectifier energized by the output of said oscillator having an input connected to the output of said amplifier and for producing a direct current output proportional to the condition being measured.

6. A condition measuring apparatus having independent span and zero adjustments comprising, in combination, an amplitude stabilized oscillator, a capacitance bridge having as two of the adjacent arms a pair of windings energized by said oscillator and as the opposite adjacent arms a capacitor responsive to the condition being measured and a first manually adjustable capacitor for varying the zero output point of said bridge, the output of said bridge being between the junction of said windings and the junction of said condition sensitive capacitor and said first manually adjustable capacitor, span adjustment means connected across the output of said bridge and comprising a second manually adjustable capacitor for providing a coarse adjustment of the span of said apparatus, and phase responsive means connected across the output of said bridge for producing a direct current proportional to the output of said capacitance bridge and including an amplifier the gain of which is adjustable to provide a fine adjustment of the span of said apparatus.

7. A condition measuring apparatus having independent span and zero adjustments comprising, in combination, an amplitude stabilized oscillator, a capacitance bridge having as two of the adjacent arms a pair of equal windings energized by said oscillator and as the opposite adjacent arms a capacitor responsive to the condition being measured and a first adjustable capacitor for varying the zero output point of said capacitance bridge, the output of said bridge being between the junction of said windings and the junction of said condition sensitive capacitor and said first manually adjustable capacitor, span adjustment means connected across the output of said bridge and comprising a second manually adjustable capacitor for providing a coarse adjustment of the span of said apparatus and an amplifier, the gain of which is adjustable to vary the output thereof to provide a fine adjustment of the span of said apparatus, and a phase-sensitive rectifier energized by the output of said oscillator having an input connected to the output of said amplifier and for producing a direct current output proportional to the condition being measured.

8. A condition measuring apparatus having independent span and zero adjustments comprising, in combination, an amplitude stabilized oscillator, a capacitance bridge having as two of the adjacent arms a pair of equal windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, a second manually adjustable capacitor connected across the output of said bridge, said second manually adjustable capacitor being substantially larger than said first manually adjustable capacitor and providing a course adjustment of the span of said measuring apparatus, a feedback stabilized amplifier having an input and output, the input of said amplifier being connected across the output of said capacitance bridge, the gain of said amplifier being variable to provide a fine span adjustment and a phase-sensitive rectifier circuit having an input and an output and energized by the output of said oscillator, the input of said rectifier circuit being connected across the output of said amplifier to produce across the output of said rectifier circuit a direct current proportional to the capacity of said condition sensitive capacitor.

9. A condition measuring apparatus having independent span and zero adjustments comprising, in combination, an amplitude stabilized oscillator, a capacitance bridge having as two of the adjacent arms a pair of equal windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, a second manually adjustable capacitor connected across the output of said bridge, said second manually adjustable capacitor providing a coarse adjustment of the span of said measuring apparatus and phase responsive means connected across the output of said bridge circuit to produce a direct current output proportional in magnitude to the magnitude of said bridge output and in polarity to the phase of said bridge output and including a feedback stabilized amplizer, the gain of which is variable to provide a fine adjustment of the span of the apparatus.

10. A condition measuring apparatus having independent span and zero adjustments comprising, in combination, an oscillator, said oscillator having a direct current feedback path, voltage regulating means in said feedback path to stabilize the amplitude of said oscillator output, a capacitance bridge having as two of the adjacent arms a pair of windings energized by said oscillator and as the opposite adjacent arms a capacitor responsive to the condition being measured and a first adjustable capacitor for varying the zero output point of said apparatus, the output of said bridge being between the junction of said winding and the junction of said condition-sensitive capacitor and said first adjustable capacitor, a second adjustable capacitor connected across the output of said bridge for providing an adjustment of the span of said apparatus, a stabilized amplifier connected across the output of said bridge and a phase-sensitive rectifier energized by the output of said oscillator having the input connected to the output of said amplifier and for producing a direct current output proportional to the condition being measured.

11. A condition measuring apparatus having independent span and zero adjustments comprising, in combination, an oscillator, said oscillator having a direct current feedback path, voltage regulating means in said feedback path to stabilize the amplitude of said oscillator output, a capacitance bridge having as two of the adjacent arms a pair of equal windings energized by said oscillator and as the opposite adjacent arms a capacitor responsive to the condition being measured and a first manually adjustable capacitor for varying the zero output point of said apparatus, the output of said bridge being between the junction of said windings and the junction of said condition sensitive capacitor and said first manually adjustable capacitor, a second manually adjustable capacitor connected across the output of said bridge, said second manually adjustable capacitor being substantially larger than the capacitors in said capacitance bridge providing an adjustment of the span of said measuring apparatus, a feedback stabilized amplifier having an input and output, the input of said amplifier being connected across the output of said capacitance bridge, and a phase-sensitive rectifier circuit having an input and an output and energized by the output of said oscillator the input of said rectifier circuit being connected across the output of said amplifier to produce across the output of said rectifier circuit a direct current poportional to the capacity of said condition sensitive capacitor.

12. A condition measuring apparatus having independent span and zero adjustments comprising, in combination, a capacitance bridge having as a first arm a capacitor responsive to the condiiton being measured, said bridge having as a second arm adjacent to said first arm first adjustable capacitor means and as the opposite adjacent arms a pair of windings adapted to equally energize said first and second bridge arms, the output of said bridge being across the junction of said windings and the junction of said first and second arms second adjustable capacitor means connected in shunt across the output of said bridge, said first adjustable capacitor means providing and adjustment of the zero output point of said bridge, said second adjustable capacitor means providing an adjustment of the span of the output of said bridge, and phase responsive means connected in shunt with said second adjustable capacitor means across the output of said bridge for producing a direct current having a magnitude proportional to the magnitude of said bridge output and a polarity proportional to the phase of said bridge output.

References Cited
UNITED STATES PATENTS

| | | | |
|---|---|---|---|
| 2,188,628 | 1/1940 | Freysledt | 73—304 |
| 2,357,623 | 8/1944 | Reid et al. | 73—304 |
| 2,570,218 | 10/1951 | Draganjac | 73—304 |
| 2,581,085 | 1/1952 | Edelman | 73—304 |
| 3,235,792 | 2/1952 | Revesz | 324—60 X |
| 3,299,286 | 1/1967 | Rohlwes | 324—60 X |

FOREIGN PATENTS 69,950   10/1958   France.

LOUIS R. PRINCE, *Primary Examiner.*

S. C. SWISHER, *Examiner.*